Feb. 4, 1941.  C. R. BOGGS  2,230,283
VULCANIZING CHAMBER SEAL
Filed Aug. 17, 1939  3 Sheets-Sheet 1
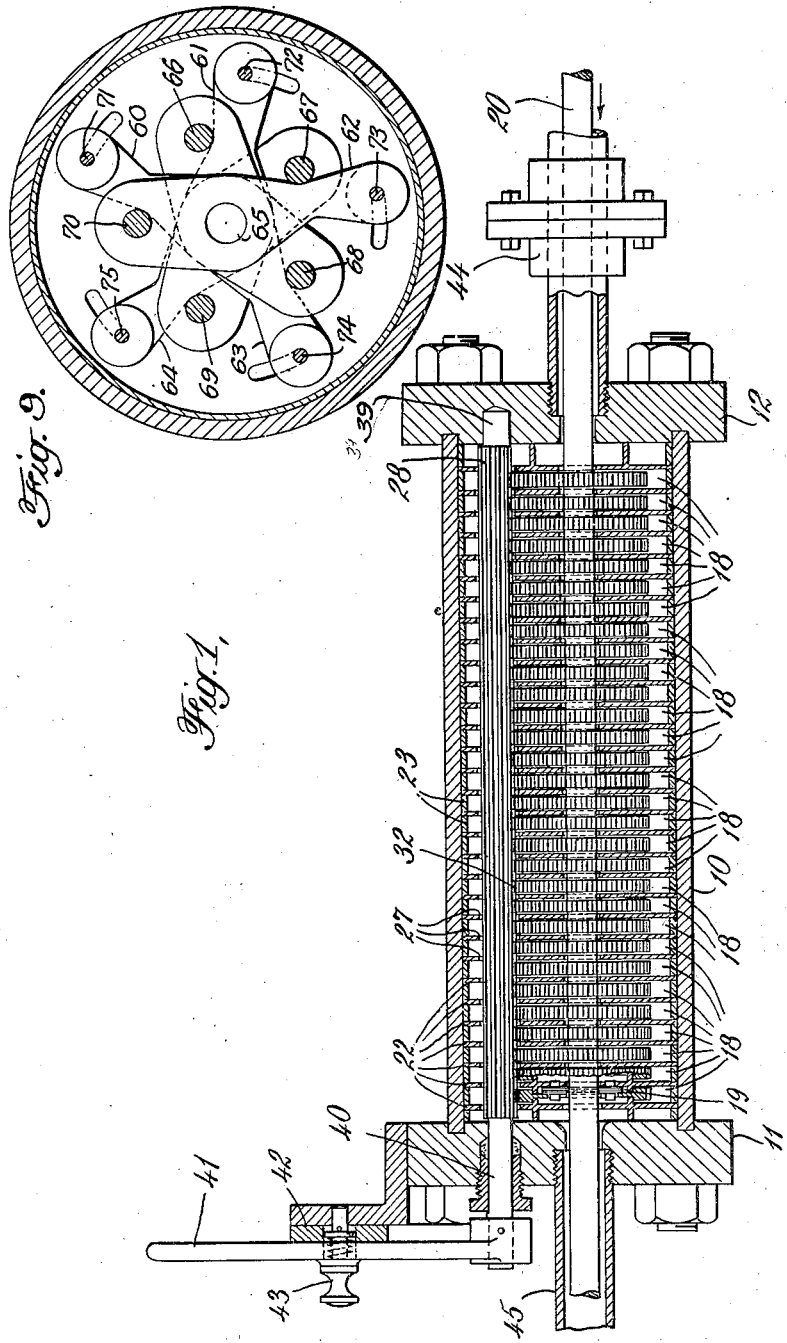
INVENTOR
Charles R. Boggs
BY
Pennie, Davis, Marvin & Edmonds
ATTORNEYS Feb. 4, 1941. C. R. BOGGS 2,230,283
VULCANIZING CHAMBER SEAL
Filed Aug. 17, 1939 3 Sheets-Sheet 2
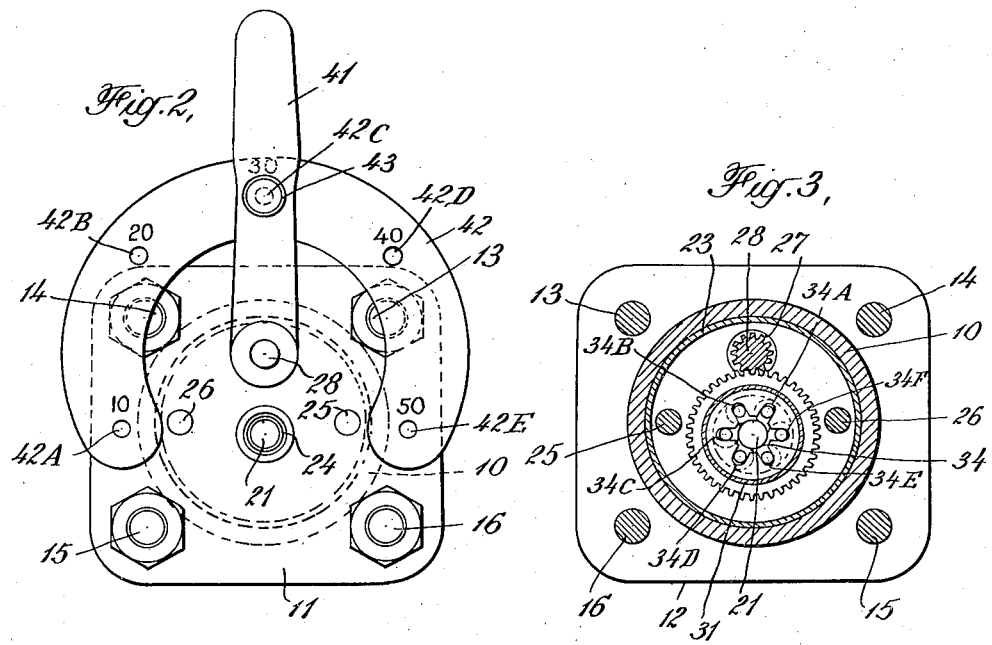
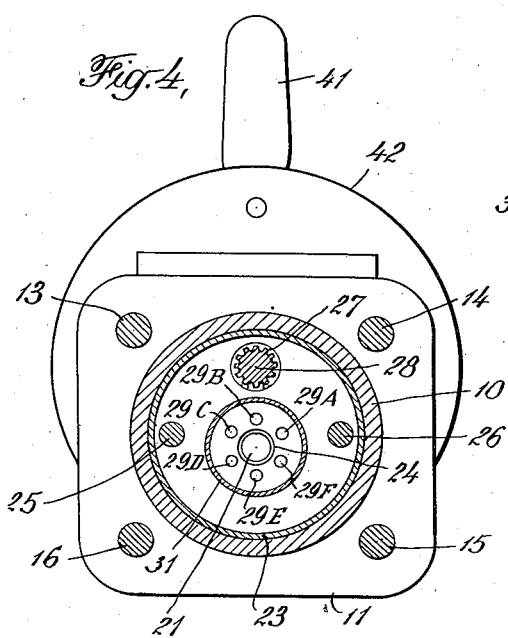
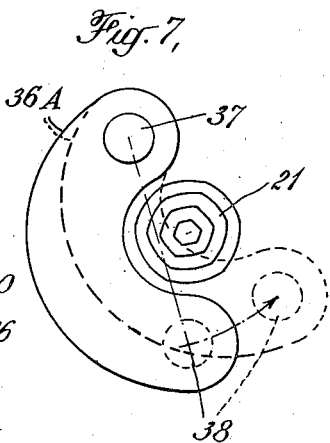
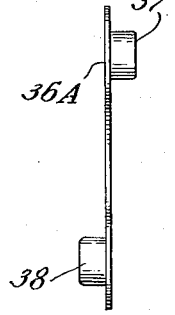
INVENTOR
Charles R. Boggs
BY
ATTORNEYS Feb. 4, 1941.   C. R. BOGGS   2,230,283
VULCANIZING CHAMBER SEAL
Filed Aug. 17, 1939   3 Sheets-Sheet 3
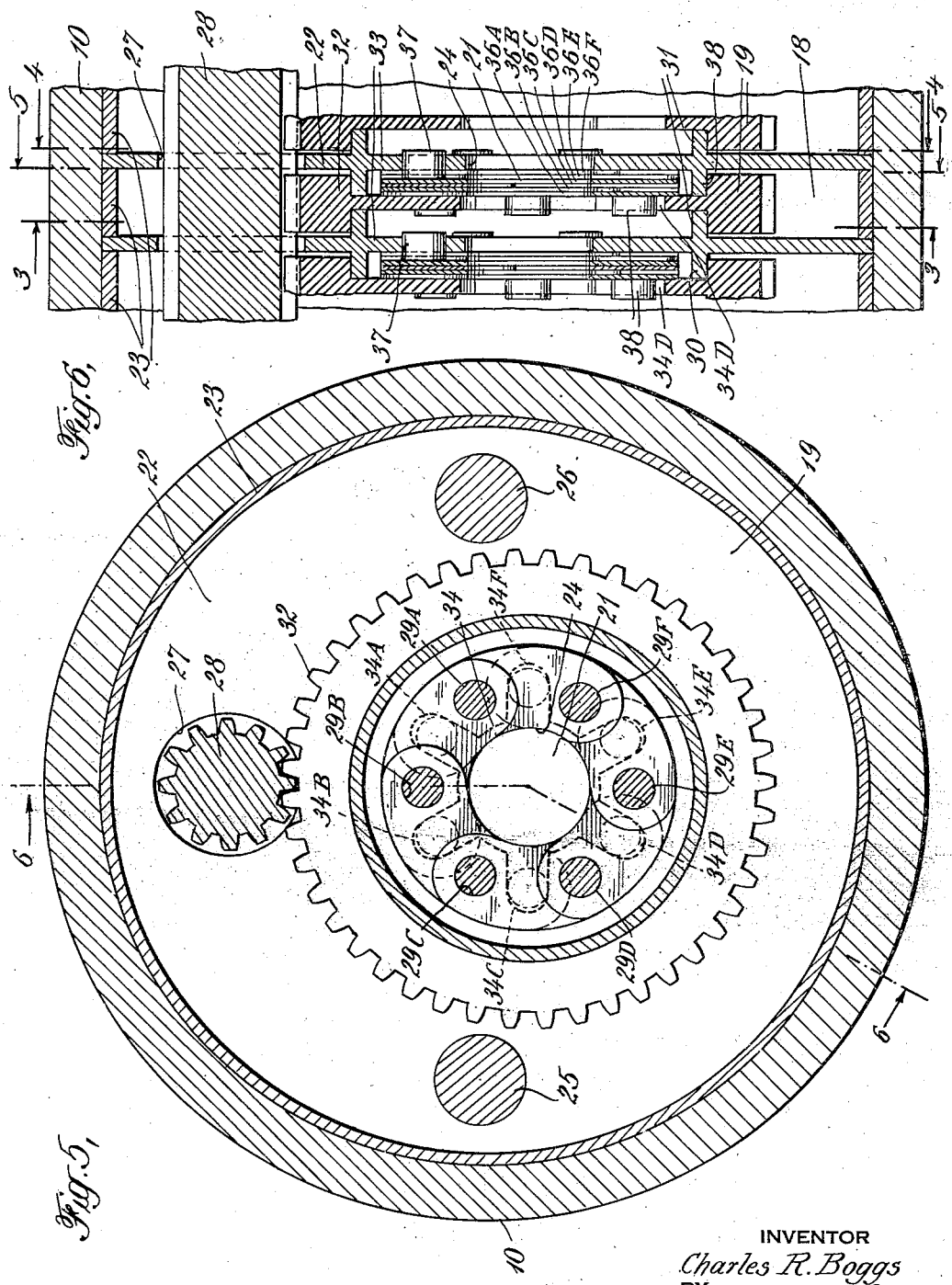
INVENTOR
Charles R. Boggs
BY
ATTORNEYS Patented Feb. 4, 1941

2,230,283

UNITED STATES PATENT OFFICE 2,230,283

VULCANIZING CHAMBER SEAL

Charles R. Boggs, Waban, Mass., assignor to Simplex Wire & Cable Company, Boston, Mass., a corporation of Massachusetts Application August 17, 1939, Serial No. 290,533

10 Claims. (Cl. 286—16)

This invention relates to seals for vulcanizing chambers and the like through which an elongated body is passed between zones of different pressures and aims to provide a seal of improved structure that is readily adjustable to fit bodies of various cross sectional sizes.

Rubber-covered wire is vulcanized in a chamber maintained at a high temperature and pressure, usually by steam, and the wire is passed through the chamber substantially continuously at a rate such that its rubber covering is vulcanized in the time that a given section remains in the chamber. To prevent leakage of steam or other vulcanizing atmosphere at the points where the wire enters and leaves the chamber, it is customary to employ seals which fit the wire, and, it has been the practice, heretofore, to change the seals whenever the size of wire treated in the chamber has been altered. This procedure is rendered unnecessary by the seal structure of my invention, which provides a series of chambers separated from each other by a series of members having orifices therein that are adjustable in size to fit the body passing through them, means being provided for adjusting the size of the orifices simultaneously and uniformly. The series of chambers and members thus provided constitutes a labyrinth which offers a high resistance to leakage of vapor through the seal and opposes this leakage with a high frictional resistance. Moreover, the chambers afford a space for vapor expansion, with a consequent diminution of vapor pressure, and this also aids to prevent leakage through the seal. If the chambers are arranged to permit dissipation of heat therefrom, condensible vapors such as steam that enter the chamber will be liquefied with consequent decrease of pressure in the chamber and increased resistance to vapor passage through the seal. Thus, in a seal through which an elongated body is passed substantially continuously in the direction of its major axis between zones of substantially different pressures, my invention contemplates the combination which comprises a series of chambers separated from each other by a series of members disposed transverse to the direction of passage of said body and having concentric orifices therein through which said body passes, and means for varying the size of said orifices uniformly and simultaneously. The members provided with the orifices preferably are mechanical irises having a plurality of overlapping plates or links with edges that form the wall of the orifice and are movable with respect to each other so that size of the orifice may be enlarged or constricted by movement of the plates.

In the preferred structure of my invention each iris is operatively associated with a gear connected to the several plates, so that all of the plates are moved in unison, and a common pinion meshed with the series of gears assures that all of the irises will be adjusted simultaneously and uniformly with respect to size and shape of their orifices. The overlapping plates of an iris preferably are pivoted off-center of the orifice in the iris, the pivots being spaced equidistant from each other around the orifice, with the plates connected to the gear by links also spaced equidistant around the orifice, so that movement of the gear will cause uniform movement of the plates and thus assure that the orifice, while changing size, will retain symmetry of shape.

Any desired number of chambers and irises may be employed, so long as the series thereof offers sufficient resistance to the passage of vapor from the zone of high pressure, say the vulcanizing chamber, and the number of chambers and irises in series may be reduced by providing means for removing heat from the chambers, to further condensation of steam and thus facilitate the action of the chambers as expansion spaces. Ordinarily, adequate heat removal may be assured by making the seal out of metal, such as brass or steel, of high thermal conductivity and exposing the exterior of the seal to the atmosphere. However, if desired, the seal may be cooled by playing a stream of water upon it, or by other means.

The labyrinth effect of the seal, resulting from resistance offered by the series of irises and expansion chambers, may be supplemented by pressure of a fluid, either liquid or vapor, introduced into the seal to oppose the pressure in the vulcanizing chamber. Thus, fluid may be introduced into one or more of the chambers or through the end of the seal opposite the zone of higher pressure. The pressure of the fluid thus introduced need not equal that of said zone and preferably is substantially less, so as to obviate the possibility of passage of the fluid through the seal into the vulcanizing chamber or other zone of high pressure.

These and other features and advantages of my invention will be more thoroughly understood in the light of the following detailed description of a presently preferred form of apparatus of my invention, illustrated by the accompanying drawings, in which:

Fig. 1 is a longitudinal schematic view, partly in section, of a seal adapted for employment on the outlet or inlet of a vulcanizing chamber for the treatment of rubber-covered wire;

Fig. 2 is an elevation of one end of the seal of Fig. 1;

Fig. 3 is a transverse section through the apparatus of Fig. 1, taken along the line 3—3 of Fig. 6;

Fig. 4 is a transverse elevation, partly in section, of the apparatus of Fig. 1 taken along the line 4—4 of Fig. 6;

Fig. 5 is an enlarged transverse section through the apparatus showing the arrangement of the mechanism for controlling the size of the orifice in an iris;

Fig. 6 is an enlarged longitudinal section of the apparatus taken along the line 6—6 of Fig. 5;

Fig. 7 is a diagram showing the relation of the size of the iris orifice to the position of one of the plates of the iris;

Fig. 8 gives another view of the iris plate of Fig. 7 and shows the pins thereon; and Fig. 9 is a schematic elevation of a cross-link type of iris adapted to the practice of my invention.

Referring now to the drawings, it will be observed that the seal comprises a steel tube 10 of circular cross section held between a pair of rectangular steel heads 11, 12 by means of four studs 13, 14, 15, 16. The ends of the tube are disposed in annular recesses in the respective heads and the studs pass through the heads and extend along the outside of the tube.

The interior of the tube is separated into a series of substantially identical chambers 18 by a series of identical mechanical irises 19. Each iris is disposed transversely to the direction of passage of an elongated body, such as a wire 20, through the seal and has an orifice 21 of adjustable size through which the wire passes.

There may be any desired number of chambers, say thirty, and the orifices of all of the irises are concentric and adjustable in unison.

The irises are supported upon a series of identical circular diaphragms 22 corresponding in diameter to the inside of the tube and extending transverse to its major axis, the diaphragms being held in spaced relationship within the tube by a series of spacer rings 23, which fit against the inside wall of the tube. Each diaphragm has a concentric circular opening 24 that is large enough to permit the passage of the largest size of wire to be vulcanized.

The diaphragms are prevented from turning within the tube by a pair of rods 25, 26 which pass through them and project into recesses in the respective heads.

In addition to the holes for the rods, each diaphragm has a relatively large hole 27 near its upper edge through which a long pinion gear 28 passes. Each diaphragm also has a series of six small holes 29A, 29B, 29C, 29D, 29E, 29F spaced equidistant around the central orifice and adapted to act as bearings for a set of pivot pins to be described hereinafter.

Each diaphragm carries a pair of integrally formed bearing rings 30, 31 disposed opposite each other and extending outwardly from the diaphragm. These rings are located a short distance from the outside edge of the plate and are concentric therewith. The rings on a given diaphragm extend horizontally to within a short distance of the outwardly extending rings on the adjacent diaphragms and the two rings in the chamber between two diaphragms form a bearing for a spur gear 32 which is placed over the rings, there being one gear in each space between plates. Each gear may be rotated easily as it is counterbored on each side to fit the rings, but has a web 33 extending within the rings. Each web has a concentrically disposed star-shaped opening 34 with six slots 34A, 34B, 34C, 34D, 34E, 34F spaced equidistant from each other around the web and adapted to receive a set of link pins, as hereinafter described.

The adjustable centrally disposed orifice 21 in each of the mechanical irises has a wall formed by curved inside edges of six overlapping plates or links 36A, 36B, 36C, 36D, 36E, 36F. The links are disposed around the periphery of the orifice, and are curved inwardly, the inside curve of each plate preferably corresponding to the curve of the cross section of the maximum diameter of wire to be passed through the seal. Each link carries two projecting pins 37, 38, one at each end and at opposite sides. The series of six links is disposed within the counterbore of the gear. The pivot pin 37 on one end of each link is located in one of the series of bearing holes in the diaphragm. The other link or pin 38 engages in one of the slots in the star-shaped opening in the gear. The several links are distributed around the periphery within the gear and overlap each other to form the iris.

The long pinion 28 runs lengthwise in the tube, is supported in one head in a bearing 39, passes through the other head in a stuffing box 40 and meshes with the entire series of spur gears 32 of the apparatus. The end of the pinion which passes through the stuffing box is shouldered and carries an operating handle or lever 41 adapted to be swung across an index plate 42 that is mounted on the head. A series of holes 42A, 42B, 42C, 42D, 42E may be provided in the index plate to correspond with appropriate settings of the irises for wires of particular diameters. A spring-held pin 43 in the handle is adapted to be fitted into any one of the several holes. The handle may be turned freely through an angle of about 230°, which in the instant apparatus permits a variation in orifice diameter in the iris ranging from one-tenth to five-tenths of an inch.

A wire which has been treated in a zone of high pressure, for example, in a vulcanizing chamber (not shown) is passed therefrom through a flanged pipe 44 into the seal. It passes through the seal and is withdrawn through an outlet pipe 45 fastened into the head at the opposite end. If desired, water or other fluid under pressure may be introduced into the outlet pipe or into any of the chambers between the various diaphragms in order to build up a pressure to resist that which tends to be imposed upon the seal from the vulcanizing chamber or other high pressure zone.

The adjustment of the size of the orifices in the irises is simple. The pinion is turned by means of the operating handle. This, in turn, brings about rotation of the series of spur gears within the seal. Each spur gear carries the ends of the six links which form the wall of the opening or orifice in the respective iris, the other ends of the links being pivoted in the holes in the diaphragm. As the spur gear is rotated, the links tend to turn upon the respective pivots in the plates and move outwardly or inwardly from the center of the seal, thus changing the size of the orifice, as illustrated particularly in Fig. 7.

It will be observed that the iris mechanism does not occupy the entire space between the diaphragms and the remainder of the chamber acts as an expansion space in which steam which tends to leak into this seal along with the wire is permitted to expand and reduce in pressure. At the same time the seal tends to be cooled so that steam escaping thereinto is condensed and may be withdrawn therefrom through a drain, if desired.

As indicated hereinbefore, a fluid may be introduced into the seal under pressure to counteract the pressure of the steam tending to leak thereinto from the vulcanizing chamber. However, if a seal having a sufficient number of irises is employed, it is unnecessary to oppose the pressure of the vulcanizing chamber with another fluid pressure in the seal.

The seal may be employed on either the inlet or outlet of a vulcanizing chamber or on both, and, if necessary, several seals may be employed in series.

The iris may be composed of any desired number of links, and the more links there are the more nearly circular is the orifice for all settings. For seals on vulcanizing chambers, however, six links per iris are sufficient, since, as shown in Fig. 7, the orifice is substantially circular in section even for small settings.

Other forms of mechanical iris, such as a cross-link type in which the orifice is formed by overlapping apertures in a series of juxtaposed plates, may be substituted for the type illustrated. Reference is made to Fig. 9 which is a schematic elevation of a cross-link type of iris adapted for use in accordance with my invention. This particular cross-link iris comprises five overlapping plates or links 60, 61, 62, 63, 64, disposed so that they overlap near the axis of the seal with their major planes at right angles thereto. Each link is provided with a circular orifice 65 near its midpoint. The edges of these orifices form the edges of the aperture of the iris.

A set of fixed pivots 66, 67, 68, 69, 70, one for each link, are spaced equiangularly in a circle around the axis of the seal. A set of movable pivots 71, 72, 73, 74, 75, one for each plate is also provded, these being spaced equiangularly in a larger circle. One end of each plate is fastened to its respective fixed pivot and the other end is fastened to the movable pivot. By means of a mechanism generally similar to that employed in the apparatus of Figs. 1 to 8, the movable pivots may be moved in unison around the axis of the seal. Such movement causes the iris formed by the overlapping orifices in the five plates to become larger or smaller depending upon the direction of movement.

Other changes in structure apparent to those skilled in the art may be made without departing from my inventive concept as claimed hereinafter.

I claim:

1. In a seal through which an elongated body is passed substantially continuously in the direction of its major axis between zones of substantially different pressure, the combination which comprises a series of chambers separated from each other by a series of members disposed transverse to the direction of passage of said body and having concentric orifices therein through which said body passes, and means for varying the size of said orifices uniformly and simultaneously.

2. In a seal through which an elongated body is passed substantially continuously in the direction of its major axis between zones of substantially different pressure, the combination which comprises a series of chambers separated from each other by a series of mechanical irises disposed transversely to the direction of passage of the body and having concentric orifices therein through which said body passes, and means for operating all of the irises simultaneously to vary the size of the orifices therein uniformly and simultaneously.

3. In a seal through which an elongated body is passed substantially continuously in the direction of its major axis between zones of substantially different pressure, the combination which comprises a series of chambers separated from each other by a series of mechanical irises disposed transversely to the direction of passage of the body and having orifices therein through which said body passes, means for operating the irises simultaneously to vary the size of the orifices therein in unison, and means for introducing a fluid under pressure into at least some of said chambers to oppose the pressure of the fluid through said seal from the zone of high pressure to the zone of lower pressure.

4. In a seal through which an elongated body is passed substantially continuously in the direction of its major axis between zones of substantially different pressure, the combination which comprises a series of chambers separated from each other by a series of mechanical irises disposed transversely to the direction of passage of the body and having orifices therein through which said body passes, means for varying the size of the orifices in the irises uniformly and substantially simultaneously, and means for cooling the chambers.

5. In a seal through which an elongated body is passed substantially continuously in the direction of its major axis between zones of substantially different pressure, the combination which comprises a series of chambers separated from each other by a series of mechanical irises disposed transversely to the direction of passage of the body and having concentric orifices therein through which the body passes, each iris being disposed of a plurality of plates spaced around the orifices therein so that the edges of the plates form the wall of said orifices, and having means for moving said plates to change the size of said orifice, and means for moving the plates of all of the irises in unison to change the shape of the orifices simultaneously and uniformly.

6. In a seal through which an elongated body is passed substantially continuously in the direction of its major axis between zones of substantially different pressure, the combination which comprises a series of chambers separated from each other by a series of mechanical irises disposed transverse to the direction of passage of the body and having concentric orifices therein through which the body passes, each iris being composed of a plurality of plates having edges which form the wall of the orifice and said plates being pivoted off-center of the orifice and movable in unison to change the size of the orifice, and means for moving the plates of the irises of the series simultaneously and in unison to uniformly change the size of the orifices.

7. In a seal through which an elongated body is passed substantially continuously in the direction of its major axis between zones of substantially different pressure, the combination which comprises a series of chambers separated from each other by a series of mechanical irises disposed transverse to the direction of the passage of the body and having concentric orifices therein through which the body passes, each iris being composed of a plurality of plates having edges which form the wall of the orifices and said plates being pivoted off-center of the orifice and movable in unison about the respective pivots to change the size of the orifice, a series of gears operatively associated with the plates of the respective irises for moving the plates about their respective pivots, and a pinion meshing with said gears for moving the plates of the series of irises in unison.

8. In a seal through which an elongated body is passed substantially continuously in the direction of its major axis between zones of substantially different pressure, the combination which comprises a series of chambers separated from each other by a series of mechanical irises disposed transversely to the direction of passage of the body and having concentric apertures therein through which the body passes, each iris being composed of a plurality of plates having edges which form the wall of said orifices, said plates being pivoted at points off-center of the orifice and movable in unison around said pivots to change the size of the orifice, a series of gears operatively associated with the plates of the respective irises for moving the plates about their respective pivots, a pinion meshing with said gears and disposed longitudinally in the direction of passage of the body, and a member connected to said pinion for moving it.

9. In a seal through which an elongated body is passed substantially continuously in the direction of its major axis between zones of substantially different pressure, the combination which comprises a series of chambers separated from each other by a series of mechanical irises disposed transverse to the direction of the passage of the body and having concentric apertures therein through which the body passes, each iris being disposed of a plurality of plates having edges which form the wall of the orifice, said plates being pivoted at points off-center of the orifice and movable in unison to change the shape of the orifice, mechanical means for moving the plates of each iris of the series in unison, and mechanical means for adjusting all of the irises simultaneously to alter the size of the orifices therein.

10. In a seal through which an elongated body is passed substantially continuously in the direction of its major axis between zones of substantially different pressure, the combination which comprises a series of chambers separated from each other by a series of mechanical irises disposed transverse to the direction of the passage of the body and having concentric apertures therein through which the body passes, each iris being composed respectively of a plurality of overlapping plates having edges which form the wall of the orifice, said plates being pivoted at points off-center of the orifice and movable about their respective pivots to change the size of the orifice, a series of gears operatively associated with the plates of the respective irises for moving the plates about their respective pivots, said gears having slots therein in which pins attached to the plates are mounted, and a pinion meshed with said series of gears for moving the plates of a series of irises in unison.

CHARLES R. BOGGS.